(12) United States Patent
Hwang et al.

(10) Patent No.: US 8,991,200 B2
(45) Date of Patent: Mar. 31, 2015

(54) AIR CONDITIONER AND METHOD OF OPERATING AN AIR CONDITIONER

(75) Inventors: Junhyeon Hwang, Changwon-si (KR); Hongseok Choi, Changwon-si (KR); Changhwan Cho, Changwon-si (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 13/617,321

(22) Filed: Sep. 14, 2012

(65) Prior Publication Data

US 2013/0133345 A1 May 30, 2013

(30) Foreign Application Priority Data

Nov. 28, 2011 (KR) .......................... 10-2011-0125288

(51) Int. Cl.
*F25D 17/02* (2006.01)
*F24F 3/06* (2006.01)
(Continued)

(52) U.S. Cl.
CPC . *F24F 3/06* (2013.01); *F25B 13/00* (2013.01); *F24D 3/18* (2013.01); *F25B 25/005* (2013.01);
(Continued)

(58) Field of Classification Search
CPC ..... F24F 3/06; F24F 3/065; F24F 2011/0068; F25B 49/027; F25B 2313/004; F25D 17/02
USPC ................ 62/181, 183, 185, 196.4, 199, 201; 236/51; 700/276, 278
See application file for complete search history.

(56) References Cited

U.S. PATENT DOCUMENTS 5,184,472 A 2/1993 Guilbault et al. ................ 62/160
7,308,384 B2 * 12/2007 Shah et al. ..................... 702/183
(Continued)

FOREIGN PATENT DOCUMENTS

GB 2 253 037 A 8/1992
JP 2008-082653 4/2008
(Continued)

OTHER PUBLICATIONS

European Search Report dated Jan. 16, 2014, issued in Application No. 12 18 3017.
(Continued)

*Primary Examiner* — Marc Norman
(74) *Attorney, Agent, or Firm* — KED & Associates, LLP

(57) ABSTRACT

An air conditioner and a method of operating an air conditioner are provided. The air conditioner may include at least one indoor device, each having an indoor heat exchanger installed therein; at least one outdoor device connected to the at least one indoor device by a refrigerant flow path, and each having a water-refrigerant heat exchanger that provides heat exchange between a refrigerant and heat source water and an outdoor device controller installed therein; a heat source water flow path connected to each water-refrigerant heat exchanger; a pump installed on the heat source water flow path; a variable flow valve installed on the heat source water flow path; a central controller that controls the at least one outdoor device; and a variable flow valve control board that regulates an opening degree of the variable flow valve and a flow rate of heat source water. The variable flow valve control board may be connected to the outdoor device controller via a first communication line, connected to the central controller via a second communication line having a different communication method from that of the first communication line, and perform protocol conversion between the central controller and the outdoor device controller.

21 Claims, 5 Drawing Sheets

(51) Int. Cl.
*F25B 13/00* (2006.01)
*F24D 3/18* (2006.01)
*F25B 25/00* (2006.01)
*F24D 19/10* (2006.01)
*F24F 11/00* (2006.01)

(52) U.S. Cl.
CPC .............. *F24F 3/065* (2013.01); *F24D 2200/11* (2013.01); *F24F 2011/0082* (2013.01); *F25B 2313/006* (2013.01); *F25B 2313/0233* (2013.01); *F25B 2313/0253* (2013.01); *F25B 2313/02741* (2013.01); *F25B 2339/047* (2013.01); *F25B 2600/2515* (2013.01); *F24D 19/1039* (2013.01)
USPC ................................. 62/181; 62/185; 236/51

(56) References Cited

U.S. PATENT DOCUMENTS 7,774,102 B2 * 8/2010 Butler et al. ................. 700/276
2012/0297812 A1 * 11/2012 Takata et al. ................. 62/324.6

FOREIGN PATENT DOCUMENTS

| JP | 2011-094937 | 5/2011 |
| KR | 10-2010-0046694 | 5/2010 |
| WO | WO 2011/114368 A1 | 9/2011 |

OTHER PUBLICATIONS

International Search Report dated Mar. 7, 2013. (PCT/KR2012/009946).
Korean Notice of Allowance dated Mar. 8, 2013.

* cited by examiner

AIR CONDITIONER AND METHOD OF OPERATING AN AIR CONDITIONER

CROSS-REFERENCE TO RELATED APPLICATION(S)

This application claims priority under 35 U.S.C. §119 to Korean Application No. 10-2011-0125288 filed on Nov. 28, 2011, whose entire disclosure is hereby incorporated by reference.

BACKGROUND

1. Field

An air conditioner and a method of operating an air conditioner are disclosed herein.

2. Background

Air conditioners are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
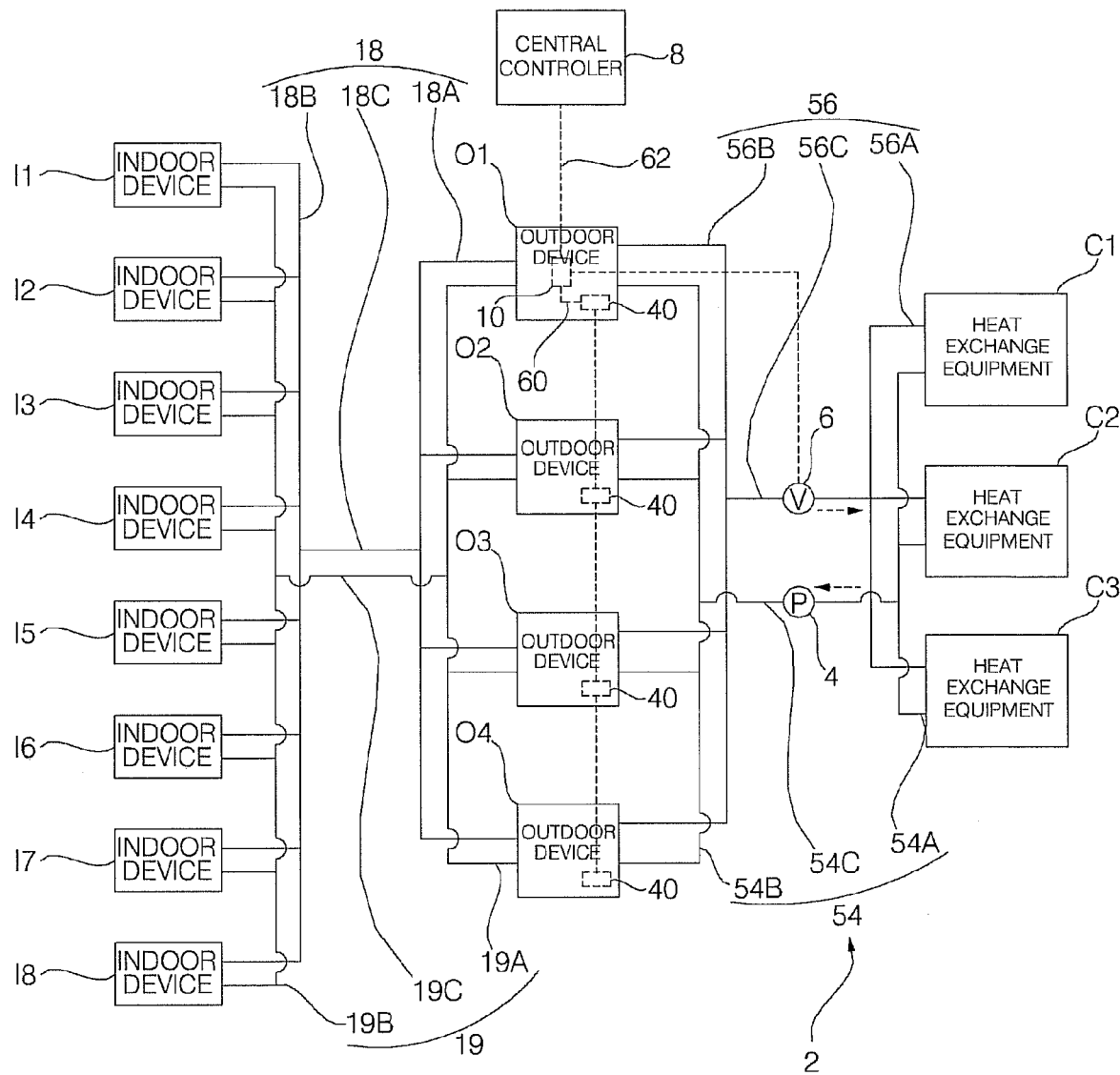
FIG. 1 is a schematic diagram of an air conditioner according to an embodiment.

Hereinafter, an air conditioner according to embodiments will be described below with reference to the accompanying drawings. Where possible, like reference numerals have been used to indicate like elements.

Generally, an air conditioner is an appliance that cools or heats a room using a refrigerating cycle of a refrigerant, which performs a cooling operation or a heating operation by sequentially compressing, condensing, expanding, and evaporating the refrigerant and absorbing surrounding heat when the refrigerant is vaporized and releasing the heat when the refrigerant is liquefied. The air conditioner may condense or evaporate the refrigerant with outdoor air, and may also condense or evaporate the refrigerant with heat source water.

The air conditioner may include a water-refrigerant heat exchanger that performs heat exchange between heat source water and a refrigerant. The water-refrigerant heat exchanger may be installed between a compressor and an expansion device to allow the refrigerant to be condensed or evaporated with water.

An inflow path may be provided that supplies heat source water to the water-refrigerant heat exchanger and an outflow path may be provided that allows the heat source water heat-exchanged with the refrigerant to flow out of the heat exchanger, which may be, for example, a plate-type heat exchanger. A pump and a variable flow valve may be installed on the inflow path or the outflow path.

Figure 2:
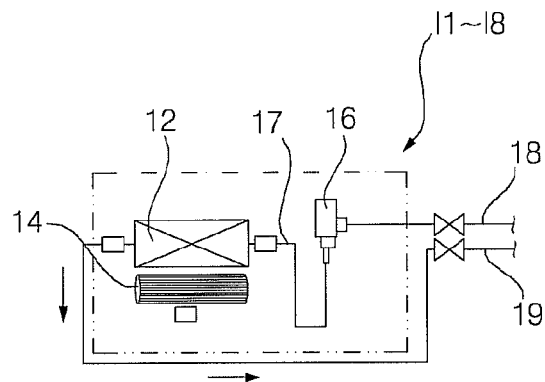
FIG. 2 is a schematic diagram of an exemplary indoor device of the air conditioner of FIG. 1.
Figure 3:
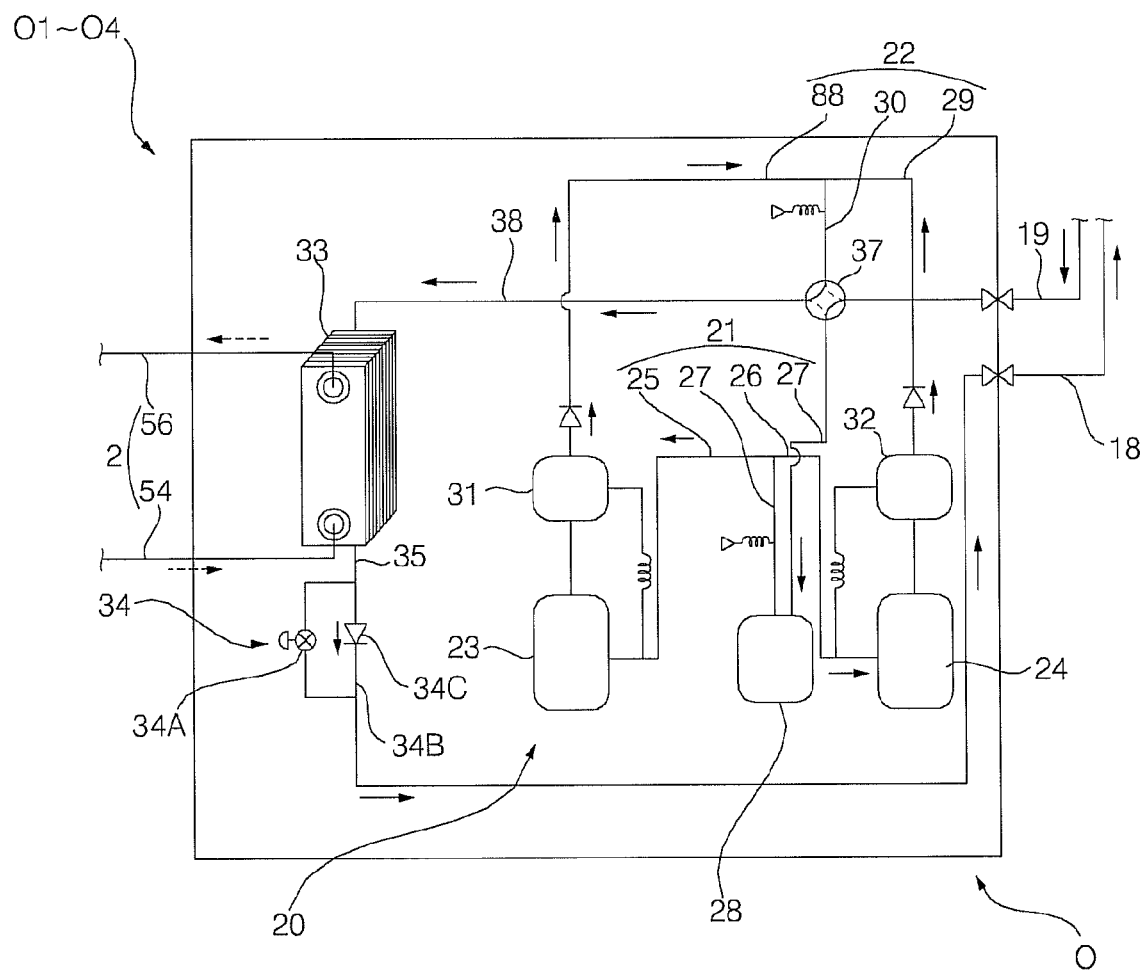
FIG. 3 is a schematic diagram of an exemplary outdoor device of the air conditioner of FIG. 1.

FIG. 1 is a schematic diagram of an air conditioner according to an embodiment. FIG. 2 is a schematic diagram of an exemplary indoor device of the air conditioner of FIG. 1. FIG. 3 is a schematic diagram of an exemplary outdoor device of the air conditioner of FIG. 1.

The air conditioner of FIG. 1 may include a plurality of indoor devices 11 to 18, a plurality of outdoor devices O1 to O4, a heat source water flow path 2, a pump 4, a variable flow valve 6, a central controller 8, and a variable flow valve control board 10.

As shown in FIG. 2, an indoor heat exchanger 12 may be installed in each indoor device I1 to I8. The indoor heat exchanger 12 may cool or heat a room by heat exchange between indoor air and a refrigerant. The indoor devices I1 to I8 may include an indoor fan 14 that blows indoor air to the indoor heat exchanger 12 and then discharges it to the room. Each indoor device I1 to I8 may include an indoor expansion device 16 that expands refrigerant flowing to the indoor heat exchanger 12. The indoor expansion device 16 may be, for example, an electronic expansion valve, such as a LEV valve. The indoor expansion device 16 may be connected to the indoor heat exchanger 12 by an indoor heat exchanger connecting flow path 17. The indoor heat exchanger 12 may function as an evaporator that evaporates the refrigerant by heat exchange with indoor air when a low-temperature, low-pressure refrigerant expanded by the indoor expansion device 16 passes therethrough; whereas, the indoor heat exchanger 12 may function as a condenser that condenses the refrigerant by heat-exchange with indoor air when a high-temperature, high-pressure refrigerant flowing from the outdoor device O1 to O4 passes therethrough.

The plurality of outdoor devices O1 to O4 may be connected to the plurality of indoor devices I1 to I8 by refrigerant flow paths 18 and 19. The refrigerant flow paths 18 and 19 may include a liquid pipe 18, through which a liquid-phase refrigerant may pass, and a gas pipe 19, through which a gas-phase refrigerant may pass. The liquid pipe 18 may include an outdoor device connecting liquid pipe 18A connected to the outdoor devices, an indoor device connecting liquid pipe 18B connected to the indoor devices, and a common liquid pipe 18C that connects the outdoor device connecting liquid pipe 18A and the indoor device connecting liquid pipe 18B. The gas pipe 19 may include an outdoor device connecting gas pipe 19A connected to the outdoor devices, an indoor device connecting gas pipe 19B connected to the indoor devices, and a common gas pipe 19C that connects the outdoor device connecting gas pipe 19A and the indoor device connecting gas pipe 19B.

As shown in FIG. 3, each of the outdoor units O1 to O4 may include a compression device 20 may suck in and compress a refrigerant and then discharges it. The compression device 20 may suck in and compress the refrigerant from a refrigerant intake passage 21 and then discharges it to a refrigerant discharge passage 22. The compression device 20 may be configured to be variable in capacity. The compression device 20 may include at least one compressor connected to the refrigerant intake passage 21 and the refrigerant discharge passage 22. The at least one compressor may include compressors 23 and 24. The compressors 23 and 24 may include one inverter compressor having a variable compression capacity, or may include an inverter compressor with variable compression capacity and a constant speed compressor having a constant compression capacity. The following description will be made with respect to an example including an inverter compressor 23 and a constant speed compressor 24.

The refrigerant intake passage 21 may be connected in parallel to the inverter compressor 23 and the constant speed compressor 24. The refrigerant intake passage 21 may include an inverter compressor intake passage 25 connected to the inverter compressor 23, a constant speed compressor intake passage path 26 connected to the constant speed compressor 24, and a common intake passage 27 connected to the inverter compressor intake passage 25 and the constant speed compressor intake passage 26. An accumulator 28 that accumulates liquid refrigerant from the refrigerant may be installed on the refrigerant intake passage 21, in particular, the common intake passage 27. The refrigerant discharge passage 22 may be connected in parallel to the inverter compressor 23 and the constant speed compressor 24. The refrigerant discharge passage 22 may include an inverter compressor discharge passage 88 connected to the inverter compressor 23, a constant speed compressor discharge passage 29 connected to the constant speed compressor 24, and a common discharge passage 30 connected to the inverter compressor discharge passage 28 and the constant speed discharge passage 29. An inverter compressor oil separator 31 may be installed on the refrigerant discharge passage 22 to separate oil from the refrigerant discharged from the inverter compressor 23 and return it to the refrigerant intake passage 21. A constant speed compressor oil separator 32 may be installed on the refrigerant discharge passage 22 to separate oil from the refrigerant discharged from the constant speed compressor 24 and return it to the refrigerant intake passage 21.

Each of the outdoor devices O1 to O4 may include a water-refrigerant heat exchanger 33 that provides heat exchange between a refrigerant and heat source water. The water-refrigerant heat exchanger 33 may be a heat exchanger that condenses or evaporates a refrigerant by heat exchange with heat source water. The water-refrigerant heat exchanger 33 may be formed with a refrigerant heat exchange passage that condenses or evaporates a refrigerant passing therethrough, and a heat source water heat exchange passage that heats or cools heat source water passing therethrough. The heat source water flow path 2 may be connected to the water-refrigerant heat exchanger 33. A detailed description of the heat source water flow path 2 will be provided hereinafter.

Each of the outdoor devices O1 to O4 may include an outdoor expansion device 34 that expands the refrigerant flowing to the water-refrigerant heat exchanger 34. The outdoor expansion device 34 may be connected to the water-refrigerant heat 33 by a water-refrigerant heat exchanger connecting flow path 35. The outdoor expansion device 34 may be connected to the indoor expansion device 16 by the refrigerant flow path 18. The outdoor expansion device 34 may include an outdoor expansion valve 34A that expands the refrigerant passing therethrough during a heating operation, a bypass passage 34B that allows the refrigerant flowing from the water-refrigerant heat exchanger 33 to bypass the outdoor expansion valve 34A during a cooling operation and a check valve 34C installed on the bypass passage 34B.

The air conditioner may be a combined cooling/heating air conditioner having a cooling cycle and a heating cycle, and may further include a cooling/heating switching valve 37 that switches between a cooling operation and a heating operation. The cooling/heating switching valve 37 may be installed in each of the outdoor devices O1 to O4, together with the compression device 20 and the outdoor expansion device 34.

The cooling/heating switching valve 37 may be connected to the refrigerant intake passage 21, the refrigerant discharge passage 22, the water-refrigerant heat exchanger 33, and the indoor heat exchanger 12. The cooling/heating switching valve 37 may be connected to the common intake passage 27 of the refrigerant intake passage 21. The cooling/heating switching valve 37 may be connected to the common discharge passage 30 of the refrigerant discharge passage 22. The cooling/heating switching valve 37 may be connected to the water-refrigerant heat exchanger 33 by a connecting passage 38. The cooling/heating switching valve 37 may be connected to the indoor heat exchanger 12 by the refrigerant flow path 19.

In a cooling operation, the cooling/heating switching valve 37 may guide the refrigerant compressed in the compression device 20 and discharged to the refrigerant discharge passage 22 to flow to the water-refrigerant heat exchanger 33 and guide the refrigerant flowing from the indoor heat exchanger 12 to flow to the refrigerant intake passage 21. In a heating operation, the cooling/heating switching valve 37 may guide the refrigerant compressed in the compression device 20 and discharged to the refrigerant discharge passage 22 to flow to the indoor heat exchanger 12 and guide the refrigerant flowing from the water-refrigerant heat exchanger 33 to flow to the refrigerant intake passage 21.

An outdoor device controller 40 which may be a PCB, may be installed in each of the outdoor devices O1 to O4. The outdoor device controller 40 may control the compression device 20, the outdoor expansion device 34, and the cooling/heating switching valve 37 depending on the operation of the indoor devices 11 to 18, and low pressure and high pressure of the outdoor device O1 to O4 in which the outdoor device controller 40 is installed. The outdoor device controller 40 may be connected to the outdoor device controller 40 of other outdoor devices. In such an air conditioner, one of a plurality of outdoor device controllers 40 may become a master outdoor device controller, and the other outdoor device controllers may become slave outdoor device controllers.

The heat source water flow path 2 may be connected to external heat exchange equipment C1 to C3 that heat-exchanges the heat source water, which is then heat-exchanged with the refrigerant in the water-refrigerant heat exchanger 33, with outdoor air or ground heat. The heat source water flow path 2 may include an inflow path 54 that allows the heat source water having passed through the external heat exchange equipment C1 to C3 to flow into the water-refrigerant heat exchanger 33 and an outflow path 56 that allows the heat source water heat-exchanged with the refrigerant in the water-refrigerant heat exchanger 33 to flow out to the external heat exchange equipment C1 to C3. The external heat exchange equipment C1 to C3 may include of a cooling tower that cools the heat source water having flowed out through the outflow path 56 with outdoor air, a ground heat exchanger that exchanges the heat source water having flowed out through the outflow path 56 with ground heat, and a boiler that heats the heat source water having flowed out through the outflow path 56. Alternatively, the external heat exchange equipment C1 to C3 may be a combination of the cooling tower, the ground heat exchanger, and the boiler. The inflow path 54 may include an external heat exchange equipment connecting inflow path 54A connected to the external heat exchange equipment C1 to C3, a water-refrigerant heat exchanger connecting inflow path 54B connected to the water-refrigerant heat exchanger 33, and a common inflow path 54C that connects the outdoor heat exchange equipment connecting inflow path 54A and the water-refrigerant heat exchanger connecting inflow path 54B. The outflow path 56 may include an external heat exchange equipment connecting outflow path 56A connected to the external heat exchange equipment C1 to C3, a water-refrigerant heat exchanger connecting outflow path 56B connected to the water-refrigerant heat exchanger 33, and a common outflow path 56C connecting the external heat exchange equipment connecting outflow path 56A and the water-refrigerant heat exchanger connecting outflow path 56B.

The pump 4 may be installed on the heat source water flow path 2. The pump 4 may allow heat source water to circulate through the water-refrigerant heat exchanger 33 and the external heat exchange equipment C1 to C3. The pump 4 may pump heat source water so that the heat source water circulates through the water-refrigerant heat exchanger 33, the outflow path 56, the external heat exchange equipment C1 to C3, and the inflow path 54. The pump 4 may be installed on at least one of the inflow path 54 or the outflow path 56. The pump 4 may be installed on a common flow path of the heat source water flow path 2. That is, the pump 4 may be installed on the common inflow path 54C or the common outflow path 56C. The pump 4 may be a variable capacity pump, or an inverter pump which varies in capacity depending on input frequency, or a plurality of constant speed pumps having a variable pumping capacity. The pump 4 may include a pressure sensor that senses pressure. If a pressure drop becomes larger due to a decrease in an opening degree of the variable flow valve 6, the pressure sensor may sense this, a number of turns of the pump 4 may be decreased, and power consumption input to the pump 4 may be minimized. On the other hand, if a pressure drop becomes smaller due to an increase in the opening degree of the variable flow valve 6, the pressure sensor may sense this, and the number of turns of the pump 6 may be increased.

The variable flow valve 6 may be installed on the heat source water flow path 2 to regulate the heat source water entering and exiting the water-refrigerant heat exchanger 33. The variable flow valve 6 may be a valve capable of regulating the opening degree. The variable flow valve 6 may vary a flow rate of the heat source water circulating through the heat source water flow path 2 by regulating the opening degree. The variable flow valve 6 may be opened to a maximum opening degree when fully opened, and opened to a minimum opening degree when fully closed. The variable flow valve 6 may maximize the flow rate of the heat source water flow path 2 when the opening degree is maximum, and minimize the flow rate of the heat source water flow path 2 when the opening degree is minimum. The variable flow valve 6 may be installed on at least one of the inflow path 54 or the outflow path 56. A single variable flow valve 6 may be installed in on the common flow path of the heat source water flow path 2. That is, the variable flow valve 6 may be installed on the common inflow path 54C or the common outflow path 56C.

The central controller 8 may control the plurality of outdoor devices O1 to O4. The central controller 8 may be an air conditioner controller capable of controlling the plurality of outdoor devices O1 to O4 all together. If a manager of the air conditioner controls the plurality of outdoor devices O1 to O4 by means of the central controller 8, each of the outdoor devices O1 to O4 may be controlled under the control of the central controller 8, and the plurality of indoor devices 11 to 18 may be controlled. A manipulation device that allows the manager to manipulate an operation capacity of the outdoor devices O1 to O4 and the flow rate of the heat source water through the variable flow valve 6 may be installed in the central controller 8.

The variable flow valve control board 10, together with the outdoor device controller 40, may be installed in the plurality of outdoor devices O1 to O4. The variable flow valve control board 10 may be installed in any one of the plurality of outdoor devices O1 to O4.

Figure 4:
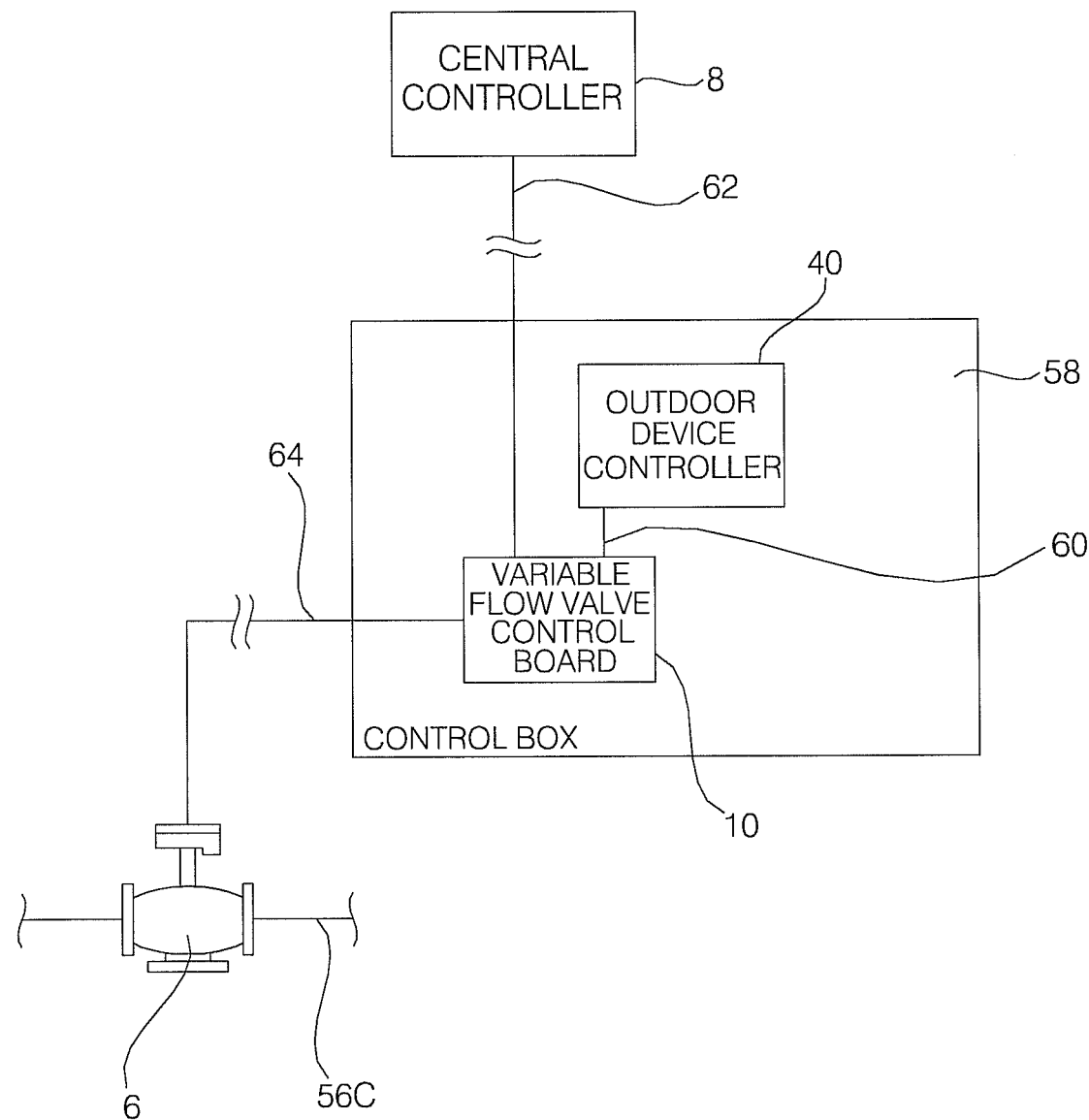
FIG. 4 is a schematic diagram of an outdoor device controller and a variable flow valve control board according to an embodiment.
Figure 5:
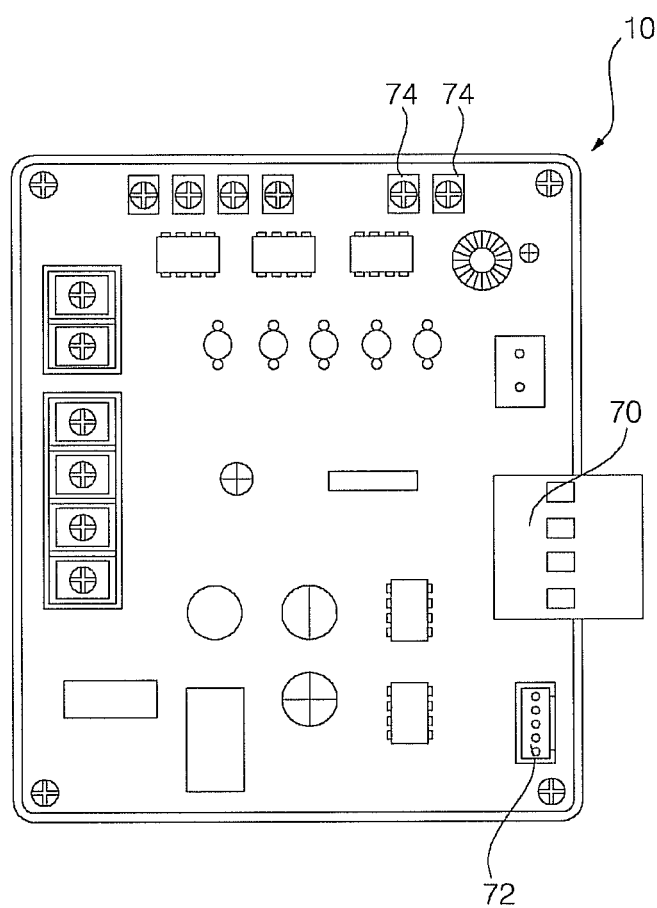
FIG. 5 is an enlarged view showing the variable flow valve control board of FIG. 4.

FIG. 4 is a schematic diagram of an outdoor device controller and a variable flow valve control board according to an embodiment. FIG. 5 is an enlarged view showing the variable flow valve control board of FIG. 4.

The variable flow valve control board 10, together with the outdoor device controller 40, may be installed in a control box 58 of any one of the plurality of outdoor devices O1 to O4. The variable flow valve control board 10 may be connected to the outdoor device controller 40 via a first communication line 60. The variable flow valve control board 10 may be connected to the central controller 8 via a second communication line 62 having a different communication method from that of the first communication line 60. The variable flow valve control board 10 may be capable of protocol conversion between the central controller 8 and the outdoor device controller 40.

A distance between the variable flow valve control board 10 and the central controller 8 may be longer than a distance between the variable flow valve control board 10 and the outdoor device controller 40. The second communication line 62 may allow for longer distance communication that the first communication line 60. The variable flow valve control board 10, together with the outdoor device controller 40, may be installed in the plurality of outdoor devices, and may be connected to the outdoor device controller 40 via the first communication line 60 for short-distance communication, such as TTC communication. The outdoor devices O1 to O4 may be installed, for example, on the outside or a rooftop of a building, and the central controller 8 may be installed in a central control room inside a building. The variable flow valve control board 10 may be connected to the central controller 8 via the second communication line 62 for long-distance communication, such as 485 communication, by taking the distance to the central controller 8 into account.

The variable flow valve control board 10 may be capable of performing protocol conversion according to the different communication methods of the first communication line 60 and the second communication line 62. The variable flow valve control board 10 may be a single board. The air conditioner may include a variable flow valve connector 70, to which a control line 64 that transmits an output value to the variable flow valve 6 may be connected; an outdoor device controller communication port 72, to which the first communication line 60 may be connected; and a central controller communication port 74, to which the second communication line 62 may be connected. As shown in FIG. 5, the variable flow valve connector 70, the outdoor device controller communication port 72, and the central controller communication port 74 may be installed together on the variable flow valve control board 10. That is, the variable flow valve control board 10 may function as a heat source water flow regulator that regulates the flow rate of the heat source water circulating through the water-refrigerant heat exchanger 33 by regulating the opening degree of the variable flow valve 6 and a gateway that performs protocol conversion between the central controller 8 and the outdoor device controller 40.

A method of operating an air conditioner will be described hereinbelow.

First, a user or manager of a central controller, such as central controller 8 of FIGS. 1-5, may regulate or input an operation capacity of a plurality of outdoor devices, such as the plurality of outdoor devices O1 to O4 of FIGS. 1-5, and a flow rate of heat source water of a variable flow valve, such as variable heat flow valve 6 of FIGS. 1-5, by manipulating a manipulation device of the central controller. A signal from the central controller may be transmitted to a variable flow valve control board, such as variable flow valve control board 10 of FIGS. 1-5, via a communication line, such as second communication line 62 of FIGS. 1-5.

The variable flow valve control board may regulate the flow rate of heat source water in response to the signal from the central controller. If the signal from the central controller is a signal for increasing a range of the flow rate of heat source water, the variable flow valve control board may regulate the variable flow valve to have a broader range of increase or decrease in the opening degree. If the signal from the central controller is a signal for decreasing the range of the circulation flow rate of heat source water, the variable flow valve control board may regulate the variable flow valve to have a narrower range of increase or decrease in the opening degree. A method of operating such air conditioner may include transmitting via the central controller a range of the flow rate of heat source water to the variable flow valve control board installed in an outdoor device to regulate the opening degree of the variable flow valve, and converting via the variable flow valve control board the protocol of the signal transmitted from the central controller and transmitting the same to the variable flow valve.

If the signal from the central controller is a signal for increasing the operation capacity of the plurality of outdoor devices, the variable flow valve control board may transmit the signal for increasing the operation capacity of the plurality of outdoor devices to an outdoor device controller, such as outdoor device controller 40 of FIGS. 1-5, and the outdoor device controller may control a compression device, such as compression device 20 of FIGS. 1-5, to increase the operation capacity of the plurality of outdoor devices. If the signal from the central controller is a signal for decreasing the operation capacity of the plurality of outdoor devices, the variable flow valve control board may transmit the signal for decreasing the operation capacity of the plurality of outdoor devices to the outdoor device controller, and the outdoor device controller may control the compression device to decrease the operation capacity of the plurality of outdoor devices. A method of operating such air conditioner may include transmitting via the central controller an outdoor device operation capacity signal to the variable flow valve control board installed in an outdoor device to regulate the opening degree of the variable flow valve, and connecting via the variable flow valve control board the protocol of the signal transmitted from the central controller and transmitting the same to the outdoor device controller installed in the outdoor device.

The central controller may regulate both the operation capacity of the outdoor devices and the flow rate of heat source water of the variable flow valve by means of the variable flow valve control board, and the reliability of the air conditioner may be improved.

Figure 6:
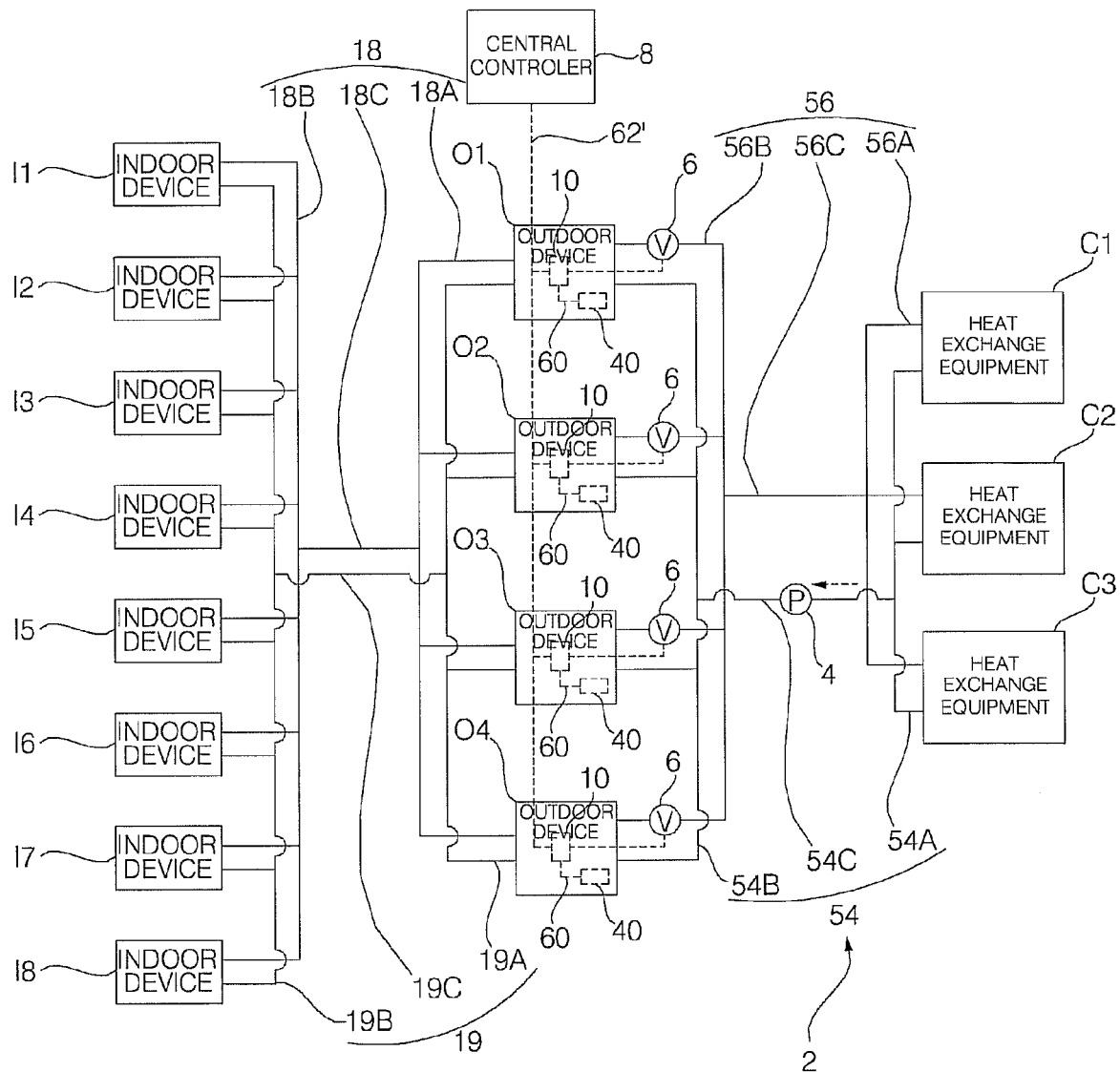
FIG. 6 is a schematic diagram of an air conditioner according to another embodiment.

FIG. 6 is a schematic diagram of an air conditioner according to another embodiment. In the air conditioner of this embodiment, the variable flow valve 6 may be installed on the water-refrigerant heat exchanger connecting flow paths 54B and 56B, respectively, of the heat source water flow path 2. The variable flow valve 6 may be installed on the water-refrigerant heat exchanger connecting inflow path 54B or the water-refrigerant heat exchanger connecting outflow path 56B for each of the outdoor devices O1 to O4.

The variable flow valve control board 10 and the outdoor device controller 40 may be installed in each of the plurality of outdoor devices O1 to O4. The variable flow valve control board 10 may be connected to the outdoor device controller 40 of each of the outdoor devices O1 to O4 via the first communication line 60. A plurality of variable flow valve control boards 10 may be connected to the central controller 8 via the second communication line 62'. The variable flow valve control board 10 may perform protocol conversion between the central controller 8 and the outdoor device controller 40 installed in each of the outdoor devices O1 to O4.

Embodiments disclosed herein provide an air conditioner, which allows a central controller to control both an outdoor unit or device and a variable flow valve through a variable flow valve control board. Embodiments disclosed herein further provide an operation method of an air conditioner, in which a variable flow valve control board can serve as a gateway between a central controller and an outdoor unit or device controller.

Embodiments disclosed herein provide an air conditioner that may include a plurality of indoor units or devices, each having an indoor heat exchanger installed therein; a plurality of outdoor units or devices, connected to the plurality of indoor units by a refrigerant flow path, and each having a water-refrigerant heat exchanger that provides heat exchange between a refrigerant and heat source water and an outdoor unit or device controller or PCB installed therein; a heat source water flow path connected to the water-refrigerant heat exchanger; a pump installed on the heat source water flow path; a variable flow valve installed on the heat source water flow path and capable of regulating an opening degree; a central controller that controls the plurality of outdoor units; and a variable flow valve control board that regulates the opening degree of the variable flow valve and a flow rate of heat source water. The variable flow valve control board may be connected to the outdoor unit PCB via a first communication line, may be connected to the central controller via a second communication line having a different communication method from that of the first communication line, and may perform protocol conversion between the central controller and an outdoor unit or device PCB.

The second communication line may allow for longer distance communication that the first communication line. The variable flow valve control board, together with the outdoor unit PCB, may be installed in the outdoor units. The variable flow valve may be installed in a singular number on a common flow path of the heat source water flow path. The variable flow valve control board may be installed in any one of the plurality of outdoor units.

A manipulation part or device that manipulates an operation capacity of the outdoor units and a circulation flow rate of the heat source water of the variable flow valve may be installed in the central controller.

Embodiments disclosed herein further provide an air conditioner that may include a plurality of indoor units or devices, each having an indoor heat exchanger installed therein; a plurality of outdoor units or devices connected to the plurality of indoor units by a refrigerant flow path, and each having a water-refrigerant heat exchanger that provides heat exchange between a refrigerant and heat source water and an outdoor unit or device controller or PCB installed therein; a heat source water flow path connected to the water-refrigerant heat exchanger; a pump installed on the heat source water flow path; a variable flow valve installed on water-refrigerant heat exchanger connecting flow paths, respectively, of the heat source water flow path, and capable of regulating an opening degree; a central controller that controls the plurality of outdoor units; and a variable flow valve control board installed in each of the plurality of outdoor units, that regulates the opening degree of the variable flow valve and a flow rate of heat source water. The variable flow valve control board may be connected to the outdoor unit PCB via a first communication line, may be connected to the central controller via a second communication line having a different communication method from that of the first communication line, and may perform protocol conversion between the central controller and an outdoor unit or device PCB.

The variable flow valve control board may be connected to the variable flow valve by a control line that transmits an output value to the variable flow valve. The variable flow valve control board may be provided with: a variable flow valve connector to which a control line may be connected; an outdoor unit or device controller communication port to which the first communication line may be connected; and a central controller communication port to which the second communication line may be connected.

The variable flow valve control board may be composed of a single board.

The first communication line may use a long-distance communication method, and the second communication line may use a short-distance communication method.

If a signal from the central controller is a signal for increasing an operation capacity of the outdoor units, the variable flow valve control board may transmit the signal for increasing the operation capacity of the outdoor units to the outdoor unit controller, and if a signal from the central controller is a signal for decreasing the operation capacity of the outdoor units, the variable flow valve control board may transmit the signal for decreasing the operation capacity of the outdoor units to the outdoor unit controller. If a signal from the central controller is a signal for increasing a range of a circulation flow rate of heat source water, the variable flow valve control board may regulate the variable flow valve to have a broader range of increase or decrease in the opening degree, and if a signal from the central controller is a signal for decreasing the range of the circulation flow rate of heat source water, the variable flow valve control board may regulate the variable flow valve to have a narrower range of increase or decrease in the opening degree.

Embodiments disclosed herein further provide an operation method of an air conditioner include a central controller transmission step in which the central controller may transmit a range of the circulation flow rate of heat source water to a variable flow valve control board installed in an outdoor unit or device to regulate an opening degree of the variable flow valve, and a variable flow valve control board transmission step in which the variable flow valve control board may convert a protocol of the signal transmitted from the central controller and transmit the same to the variable flow valve.

If a gateway is installed between the central controller and the outdoor units, the structure may be simpler because the central controller can control both the outdoor units and the variable flow valve by means of the variable flow valve control board. Moreover, reliability is high because the central controller is able to control both the operation capacity of the outdoor units and the variable flow valve.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   at least one indoor device, each having an indoor heat exchanger installed therein;
   at least one outdoor device connected to the at least one indoor device by a refrigerant flow path, each having a water-refrigerant heat exchanger that provides heat exchange between a refrigerant and heat source water and an outdoor device controller installed therein;
   a heat source water flow path connected to each water-refrigerant heat exchanger;
   a pump installed on the heat source water flow path;
   at least one variable flow valve installed on the heat source water flow path;
   a central controller that controls the at least one outdoor device; and
   a variable flow valve control board that regulates an opening degree of the at least one variable flow valve to regulate a flow rate of heat source water, wherein the variable flow valve control board is connected to the outdoor device controller via a first communication line, is connected to the central controller via a second communication line having a different communication method from that of the first communication line, and performs protocol conversion between the central controller and the outdoor device controller.

2. The air conditioner of claim 1, wherein the second communication line allows for longer distance communication than the first communication line.

3. The air conditioner of claim 1, wherein the variable flow valve control board is connected to the at least one variable flow valve by a control line that transmits an output value to the at least one variable flow valve.

4. The air conditioner of claim 3, wherein the variable flow valve control board comprises:
   a variable flow valve connector to which the control line is connected;
   an outdoor device controller communication port to which the first communication line is connected; and
   a central controller communication port to which the second communication line is connected.

5. The air conditioner of claim 1, wherein the variable flow valve control board comprises a single board.

6. The air conditioner of claim 1, wherein the variable flow valve control board, together with the outdoor device controller, is installed in the at least one outdoor device.

7. The air conditioner of claim 6, wherein the first communication line uses a long-distance communication method, and the second communication line uses a short-distance communication method.

8. The air conditioner of claim 1, wherein the at least one variable flow valve comprises a single variable flow value on a common flow path of the heat source water flow path to each water-refrigerant heat exchanger.

9. The air conditioner of claim 8, wherein the variable flow valve control board is installed in any one of the at least one outdoor device.

10. The air conditioner of claim 1, wherein a manipulation device that allows manipulation of an operation capacity of the at least one outdoor device and the flow rate of the heat source water is installed in the central controller.

11. The air conditioner of claim 10, wherein, if a signal from the central controller is a signal for increasing an operation capacity of the at least one outdoor devices, the variable flow valve control board transmits the signal for increasing the operation capacity of the at least one outdoor device to the outdoor device controller, and if a signal from the central controller is a signal for decreasing the operation capacity of the at least one outdoor device, the variable flow valve control board transmits the signal for decreasing the operation capacity of the at least one outdoor device to the outdoor device controller.

12. The air conditioner of claim 10, wherein, if a signal from the central controller is a signal for increasing a range of the flow rate of heat source water, the variable flow valve control board regulates the variable flow valve to have a broader range of increase or decrease in the opening degree, and if a signal from the central controller is a signal for decreasing the range of the flow rate of heat source water, the variable flow valve control board regulates the variable flow valve to have a narrower range of increase or decrease in the opening degree.

13. The air conditioner of claim 1, wherein the at least one indoor device comprises a plurality of indoor devices.

14. The air conditioner of claim 13, wherein the at least one outdoor device comprises a plurality of outdoor devices.

15. An air conditioner, comprising:
a plurality of indoor devices, each having an indoor heat exchanger installed therein;
a plurality of outdoor devices connected to the plurality of indoor devices by a refrigerant flow path, each having a water-refrigerant heat exchanger that provides heat exchange between a refrigerant and heat source water and an outdoor device controller installed therein;
a heat source water flow path connected to each water-refrigerant heat exchanger;
a pump installed on the heat source water flow path;
a variable flow valve installed on each of a plurality of water-refrigerant heat exchanger connecting flow paths, respectively, of the heat source water flow path;
a central controller that controls the plurality of outdoor devices; and
a variable flow valve control board installed in each of the plurality of outdoor devices, that regulates an opening degree of the respective variable flow valve and regulates a flow rate of heat source water, wherein the variable flow valve control board is connected to the outdoor device controller via a first communication line, is connected to the central controller via a second communication line having a different communication method from that of the first communication line, and performs protocol conversion between the central controller and the outdoor device controller.

16. The air conditioner of claim 15, wherein the variable flow valve control board is connected to the variable flow valve by a control line that transmits an output value to the variable flow valve.

17. The air conditioner of claim 16, wherein the variable flow valve control board includes:
a variable flow valve connector, to which the control line is connected;
an outdoor device controller communication port, to which the first communication line is connected; and
a central controller communication port, to which the second communication line is connected.

18. The air conditioner of claim 17, wherein the variable flow valve control board comprises a single board.

19. The air conditioner of claim 15, wherein the first communication line uses a long-distance communication method, and the second communication line uses a short-distance communication method.

20. The air conditioner of claim 15, wherein, if a signal from the central controller is a signal for increasing an operation capacity of the plurality of outdoor devices, the variable flow valve control board transmits the signal for increasing the operation capacity of the plurality of outdoor devices to the outdoor device controllers, and if a signal from the central controller is a signal for decreasing the operation capacity of the plurality of outdoor devices, the variable flow valve control board transmits the signal for decreasing the operation capacity of the plurality of outdoor devices to the outdoor device controllers.

21. The air conditioner of claim 15, wherein, if a signal from the central controller is a signal for increasing a range of the flow rate of heat source water, the variable flow valve control board regulates the variable flow valves to have a broader range of increase or decrease in the opening degree, and if a signal from the central controller is a signal for decreasing the range of the flow rate of heat source water, the variable flow valve control board regulates the variable flow valve to have a narrower range of increase or decrease in the opening degree.

* * * * *